United States Patent [19]

Lile

[11] 3,893,568

[45] July 8, 1975

[54] TOOL HOLDER

[76] Inventor: William H. Lile, 771-6 N. Fair Oaks, Sunnyvale, Calif. 94086

[22] Filed: Oct. 11, 1973

[21] Appl. No.: 405,394

[52] U.S. Cl.......... 211/49 R; 224/42.45 R; 248/203
[51] Int. Cl.²... A47F 7/00; B60R 9/00; A47B 81/00
[58] Field of Search............ 211/4, 5, 8, 49 R, 60 T, 211/60 SK, 64, 60; 24/263 LS, 263 PJ; 224/29 R, 42.1 G, 42.13, 42.25, 42.45 R, 224/42.31, 29 D; 296/11, 12; 248/202, 201, 203

[56] References Cited
UNITED STATES PATENTS

| 535,596 | 3/1895 | Minto | 211/49 R |
|---|---|---|---|
| 723,729 | 3/1903 | Powles | 248/37.3 |
| 1,327,439 | 1/1920 | Lewis | 248/37.6 X |
| 1,527,082 | 2/1925 | Sampson | 248/203 X |
| 1,552,535 | 9/1925 | Beerstecher | 224/42.45 R UX |
| 1,765,043 | 6/1930 | White | 211/49 R |
| 2,130,197 | 9/1938 | Schick | 211/49 R |
| 2,680,544 | 6/1954 | Hunt et al. | 224/42.45 R |
| 2,693,691 | 11/1954 | Pasanen | 248/203 X |
| 3,081,056 | 3/1963 | Young et al. | 248/203 |
| 3,432,133 | 3/1969 | Schmid | 211/60 T X |

FOREIGN PATENTS OR APPLICATIONS

| 1,173,603 | 12/1969 | United Kingdom | 248/203 |

Primary Examiner—Donald A. Griffin
Attorney, Agent, or Firm—C. Michael Zimmerman, Esq.

[57] ABSTRACT

A tool holder providing a pair of brackets 26 securable to the bed of a pick-up truck and defining an open slot adapted to stackably receive tools therein. A movable closure 31 is provided with means 41 for releasably locking same in slot closing position to prevent theft of the tools.

3 Claims, 6 Drawing Figures

PATENTED JUL 8 1975 3,893,568
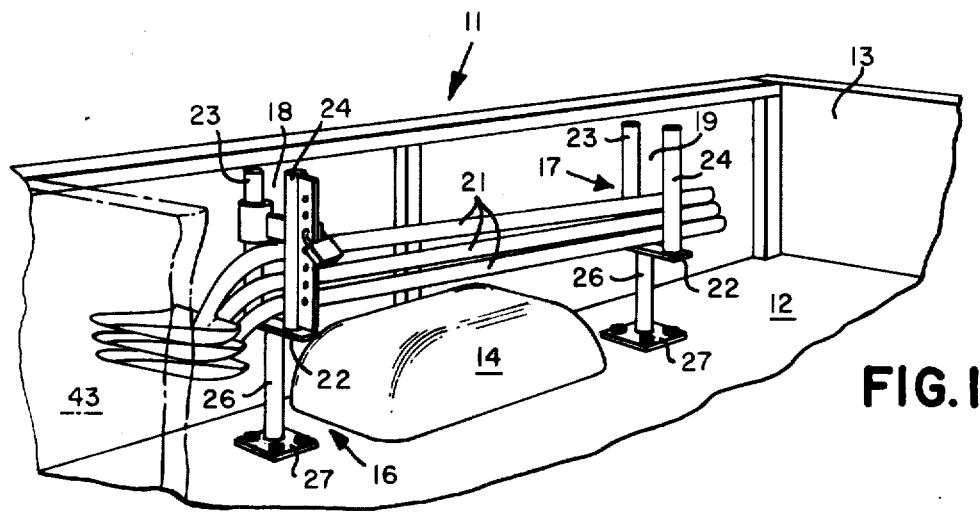
FIG.1
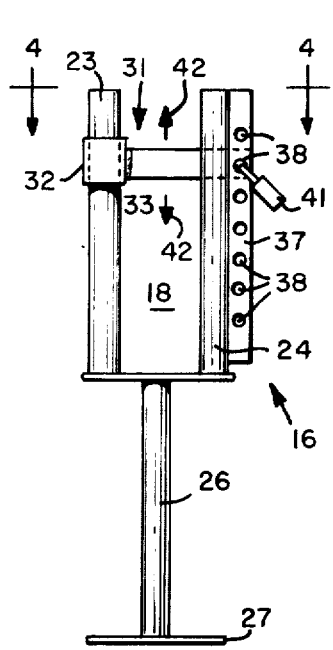
FIG.2
FIG.3
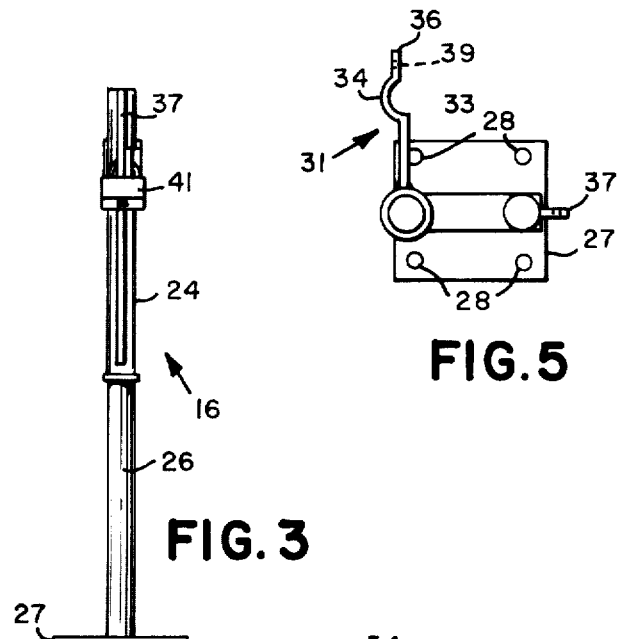
FIG.5
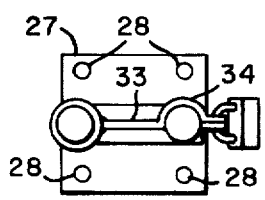
FIG.4
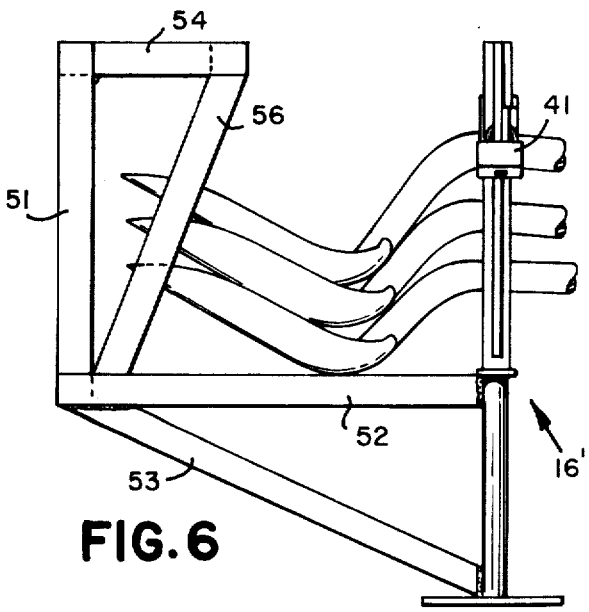
FIG.6

TOOL HOLDER

BACKGROUND OF THE INVENTION

This invention relates to a holder for elongated tools or other implements and, more particularly, to such a holder which, although quite simple, effectively prevents theft or other unauthorized removal of the tools from a designated location.

Shovels, picks and other tools or implements are often used in the construction industry, and it is common for workers to transport the same in an easily accessible location, such as in the bed of a pick-up truck or the like. The storage or transportation of such tools in such a readily accessible location, however, not only simplifies their removal by workers, but also simplifies the theft of such tools. Tool thefts from the back of pick-up trucks or the like are becoming increasingly prevalent, especially in urban areas. While lockable tool boxes which are fixedly securable within the back of pick-up trucks are now available, such boxes are relatively expensive. Moreover, they do not, in general, lend themselves readily to containing larger tools, such as shovels, along with the usual smaller tools.

SUMMARY OF THE INVENTION

The present invention provides a simple and inexpensive tool holder for shovels and the like, which tool holder is quite effective in preventing the unauthorized removal or theft of tools from a designated location, such as the bed of a pick-up truck. In its basic aspects, such tool holder includes a first bracket which defines a slot having an open end opposite a bottom wall and within which a plurality of elongated tools, such as shovels, are stackable between opposed side walls thereof. Means are provided for securely mounting the bracket to a base surface, such as to the bed of a pick-up truck, and a lockable closure is provided on the bracket means which is selectively moveable between a first position free of the open end of the slot to enable implements to be placed therein, and a second position extending across such slot blocking removal of tools through the open end of such slot. The closure includes means for locking the same in its second position blocking removal of the tools. Thus, unauthorized movement of the closure to its first position free of the open end of the slot can be prevented to assure protection of tools against theft.

Most desirably, the position of the closure is adjustable depthwise of the slot. Thus, the depth of the slot can be reduced to only that depth necessary for receiving the handles, for example, of the number of tools it is desired to protect.

The holder of the invention includes other features and advantages which will be described or will become apparent from the following more detailed description of a preferred embodiment.

BRIEF DESCRIPTION OF THE DRAWINGS

With reference to the accompanying single sheet of drawing:

FIG. 1 is a broken-away isometric view of the bed of a pick-up truck illustrating a preferred embodiment of the holder of the invention mounted therein and supporting shovels;

FIG. 2 is an enlarged, side elevation view of a bracket of the holder of the invention;

FIG. 3 is a side elevation view of the bracket of FIG. 2;

FIG. 4 is a top view of the bracket of FIG. 2 taken on a plane indicated by the lines 5—5 in FIG. 2;

FIG. 5 is a top view similar to FIG. 4 of the bracket illustrated in FIG. 2, but illustrating the slot thereof open for the reception of tools, and FIG. 6 is a side elevational view of another preferred embodiment of a bracket of the holder of the invention.

DETAILED DESCRIPTION OF THE PREFERRED EMBODIMENT

With reference to the drawing, a holder of the invention, generally referred to by the reference number 11, is shown in FIG. 1 mounted on the floor surface 12 within the bed 13 of a pick-up truck or the like. As illustrated, such holder is mounted along one sidewall of such bed, extending over the well 13 for one of the vehicle rear wheels. This location of the holder minimizes the amount of otherwise usable space in the truck bed taken up by the holder and the tools supported thereby.

Holder 11 is made of first and second brackets 16 and 17, respectively, which are spaced from one another. Each of such brackets defines a slot 18 within which a plurality of implements, such as shovels 21, are stackable. In this connection, each of the slots 18 and 19 has an upper open end facilitating insertion of the shovels, opposite a bottom wall defined by a support plate 22. The opposed sidewalls of the slot between which the shovel handles are stacked are defined by a pair of cylindrical rods 23 and 24 which are parallel to one another and project upward from spaced locations on the support plate 22.

The rods and the support plate 22 of each of the brackets defines a U-shaped member providing the desired slot within which the tools or implements are stackable. As illustrated in FIG. 1, the slots of the two brackets are in alignment with one another. They thereby cooperate to provide support for the implements at spaced locations.

Means are provided for securely mounting each of the brackets to the floor surface 12. More particularly, a supporting base is rigidly secured to the underneath side of each of the plates 22 and projects therefrom. Such supporting base includes a downwardly depending post 26 which terminates in a base plate 27. As best illustrated by FIGS. 4 and 5, the base plate 27 is provided adjacent its corners with apertures 28 through which bolts or other suitable fasteners can be inserted to securely mount the base plate and, hence, the remainder of the structure to the truck bed floor surface.

To the extent described to this point the brackets 16 and 17 are the same. As a salient feature of the invention, however, bracket 16 includes means for selectively preventing removal of implements from the holder. Specifically, a closure generally referred to by the reference numeral 31, is provided on bracket 16, hereinafter referred to at times as the first or locking bracket. Closure 31 is selectively movable between a first position free of slot 18 of locking bracket 16, and a second position extending across such slot to block removal through its open end of any implements within such slot. To this end, the closure 31 includes a sleeve 32 rotatable received on the rod 23 and from which a bar 33 projects outward for extension across the slot 18. As can be seen by comparing FIGS. 4 and 5, rotation of the sleeve 32 on the rod 23 provides the desired movement by pivoting the closure betwen its first position (FIG. 5) and its second position (FIG. 4).

The closure 31 includes means enabling the same to be locked in its second position shown in FIG. 4 to prevent unauthorized movement thereof to its first position. For this purpose, the bar 33 is provided with a half-collar reentrant portion 34 for mating with the rod 24 when it is in its closed position and terminates at its free end in an end flange 36. As best illustrated in FIG. 2, a plate 37 extends along the length of the tubular rod 24 on the side thereof opposite the slot 18. Such plate is provided spaced along its length, i.e., depthwise of the slot, with a column of apertures 38. The end flange 36 at the free end of the closure includes a corresponding aperture 39 (FIG. 5) which is registerable with any selected one of the apertures 38. A padlock 41 or other suitable locking device can then be passed through the registering slots for securing the closure free end to the bracket. Thus, only those persons having the capability of releasing such free end from the lock 41 are able to pivot the closure 31 to the open position.

As another important aspect of the present invention, the location of the closure 31 on the bracket is selectively adjustable depthwise of the slot 18. That is, the sleeve 32 is not only rotatably received on the rod 23, but is also received thereon for sliding movement axially thereof. It will be recognized that because of such sliding capability, the closure 31 is movable in the directions indicated by the arrows 42 in FIG. 2. Thus, the location at which the closure is extendable across the slot 18 is adjustable lengthwise of such slot to enable the aperture 36 of the closure to be aligned with any selected one of the apertures 38 in the plate 37. Moreover, insertion of a lock through the registering apertures will maintain the closure at such location depthwise of the slot, as well as prevent opening of the same. Thus, such closure can be moved downward to a position immediately above whatever tools are being held by the bracket so that the space within which the implements are held is maintained at a minimum.

For the holder of the invention to be capable of preventing unauthorized removal of certain types of tools, it is important that the width of the slot 18, i.e., the distance between the rods 23 and 24, be less than the width of a wider portion of each of such implements. That is, to prevent the implements from being pulled transversely through the slot for removal, the implement must have a wider portion, such as the working end of a shovel as illustrated, which cannot be pulled through the slot. In this connection, most elongated tools, e.g., picks, shovels, drum pumps, pipe threaders, etc., include such a wider portion.

If the holder of the invention is to be used with certain kinds of implements, the location at which the holder is mounted can also be important. More particularly, if the tool is not one such as a pipe threader in which the wider portion thereof is near its mid-portion, but rather is, for example, a shovel as shown, the tool will be supported by the spaced brackets with the wider portion of such tool located on the side of the bracket 16 far from bracket 17. It will thus be appreciated that, without more, the tool can simply be removed from the two brackets merely by transversely sliding the less wide portion thereof (the shovel handle) through the slot of bracket 16. That is, even though the wider portion of the shovel prevents sliding of the shovel through the slot 18 in one direction, it does not prevent it from sliding in the other direction.

As another feature of the invention, the brackets are located at specific locations on the mounting surface to prevent such easy removal of the tools. More particularly, the bracket 16 is positioned with its slot facing the front wall 43 of the truck bed. Such wall acts, in effect, as a blocking wall stopping shovels or other tools from being pulled forwardly through the brackets. The mounting surface which includes the wall 43 thus cooperates with the bracket 16 in preventing the unauthorized removal or theft of tools.

It will be appreciated that there are certain important distance relationships defining the locations at which the brackets are mounted with respect to the wall 43. Specifically, it is important that the distance between the open side of the bracket and the wall be less than the total length of the implements so that the forward movement of the implement which will be permitted, will not be enough for the rear end of the implement to clear the slot 18. Also, the distance between the wall 43 and the open side of the slot 18 facing such wall must be sufficiently large to accept the wider portion of the implement. That is, unless the distance between the open side of the slot and the wall is greater than the length of the implement between one end thereof and its wider portion, inclusive, such wider portion of the implement will not be positionable between the blocking wall and the bracket. In the case of shovels as illustrated, the wider portion thereof is at one end. Thus, the distance between the blocking wall and the open side of the bracket need only be greater than the length of the working end of the shovel to enable the shovel wider portion to be so positioned.

It will be recognized that in some instances, it will not be convenient to mount the bracket 16 adjacent a blocking wall which is part of the mounting surface. FIG. 6 illustrates an embodiment of the invention which does not require that the mounting surface include a blocking wall before it will prevent unauthorized removal of shovels or other implements which require that the wider portion thereof be positioned on the far side of the locking bracket. More particularly, with reference to such figure, a blocking wall is incorporated as a part of the locking bracket 16' thereof. That is, a post 51 is supported facing the open slot of such bracket via an outwardly projecting support plate 52 and a brace 53. Such post 51 acts as a blocking wall just as does the truck bed front wall 43 of the earlier described embodiment. In this connection, the distance relationships between the post 51 and the open side of the slot defined by the bracket 16' should be the same as discussed above in connection with the bracket 16 and the wall 43.

The locking bracket 16' includes one other feature not found in the earlier described embodiment. More particularly, an upper blocking lip in the form of a platform 54 projects inwardly from the upper end of post 51 over the area within which the shovel heads, for example, are to be located. The free end of such platform is supported by a side brace 56. The purpose of the overhanging platform 54 is to assure that the implements cannot be removed from the locking bracket by lifting their ends to clear the upper end of the blocking post 51. The side braces 56 provide the same sort of protection along the sides of such post 51.

In all other respects, the embodiment of the invention represented by FIG. 6 is the same as the earlier described embodiment.

Although preferred embodiments of the invention have been described, it will be apparent to those skilled in the art that various changes and modifications can be made. For example, the brackets are mountable onto vertical mounting surfaces, as well as on horizontal mounting surfaces such as is provided by the bed of the truck. In view of this and other changes, it is intended that the coverage afforded applicant be limited only by the language of the claims and its equivalent.

I claim:

1. A holder for preventing theft of elongated tools or other implements, each of which has a portion along its length wider than another portion thereof, comprising first bracket means defining a slot having an open end opposite the bottom wall and within which a plurality of implements are stackable between opposed slot sidewalls with such sidewalls on opposite sides of said implements, the width of said slot between said sidewalls being less than the width of said wider portion of each of said implements intended to be held thereby, whereby transverse movement of said implement wider portions through said slot is prevented; means for securely mounting said first bracket means on a surface; a closure associated with said first bracket means selectively moveable between a first position free of said slot and a second position extending across said slot to block removal of implements through the open end of said slot, one of said slot sidewalls having a plurality of apertures extending in a column depthwise of said slot, said closure cooperable with any selected one of said apertures to provide adjustment depthwise of said slot of the location at which said closure is extendable across said slot, said closure further including means for locking the same in said second position and preventing unauthorized movement thereof to said first position; second bracket means spaced from said first bracket means defining a second slot in alignment with said first slot of said first bracket means to cooperate therewith by positioning at a location spaced from said bracket means elongated tools or implements stacked within said first slot, said lockable closure being pivotally secured to said second bracket means for pivotal movement between said first and second positions, and said means for locking said closure in said second position including an aperture at the free end of said closure which is registerable with any selected one of said plurality of apertures on said first bracket means for passage therethrough of a lock for securing said closure free end to said bracket at a selected location of said closure.

2. A holder for preventing theft of elongated tools or other implements, each of which has a portion along its length wider than another portion thereof, comprising first bracket means defining a slot having an open end opposite the bottom wall and within which a plurality of implements are stackable between opposed slot sidewalls with such sidewalls on opposite sides of said implements, the width of said slot between said sidewalls being less than the width of said wider portion of each of said implements intended to be held thereby, whereby transverse movement of said implement wider portions through said slot is prevented; means for securely mounting said first bracket means on a surface; a closure associated with said first bracket means selectively moveable between a first position free of said slot and a second position extending across said slot to block removal of implements through the open end of said slot, one of said slot sidewalls having a plurality of apertures extending in a column depthwise of said slot, said closure cooperable with any selected one of said apertures to provide adjustment depthwise of said slot of the location at which said closure is extendable across said slot, said closure further including means for locking the same in said second position and preventing unauthorized movement thereof to said first position; second bracket means spaced from said first bracket means defining a second slot in alignment with said first slot of said first bracket means to cooperate therewith by positioning at a location spaced from said bracket means elongated tools or implements stacked within said first slot, and a mounting surface to which said first bracket means is securely mounted with an open end of said slot facing a blocking structure associated with said mounting surface for preventing longitudinal withdrawal of implements from said holder, the distance of the open side of said slot to said blocking structure being less than the total length of implements expected to be supported by said holder.

3. A holder for preventing theft of elongated tools or other implements, each of which has a portion along its length wider than another portion thereof, comprising first bracket means defining a slot having an open end opposite the bottom wall and within which a plurality of implements are stackable between opposed slot sidewalls with such sidewalls on opposite sides of said implements, the width of said slot between said sidewalls being less than the width of said wider portion of each of said implements intended to be held thereby, whereby transverse movement of said implement wider portions through said slot is prevented; means for securely mounting said first bracket means on a surface; a closure associated with said first bracket means selectively moveable between a first position free of said slot and a second position extending across said slot to block removal of implements through the open end of said slot, one of said slot sidewalls having a plurality of apertures extending in a column depthwise of said slot, said closure cooperable with any selected one of said apertures to provide adjustment depthwise of said slot of the location at which said closure is extendable across said slot, said closure further including means for locking the same in said second position and preventing unauthorized movement thereof to said first position; second bracket means spaced from said first bracket means defining a second slot in alignment with said first slot of said first bracket means to cooperate therewith by positioning at a location spaced from said bracket means elongated tools or implements stacked within said first slot, said first bracket means including as a part thereof a blocking structure which faces an open side of said slot at a distance therefrom which is less than the total length of the implements expected to be supported by said holder for preventing longitudinal withdrawal of implements from said holder.

* * * * *